United States Patent Office 3,192,731
Patented July 6, 1965

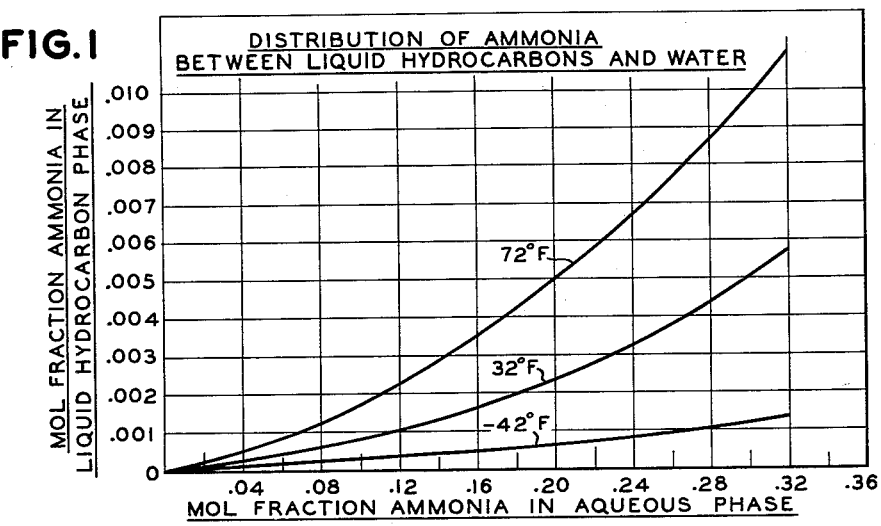
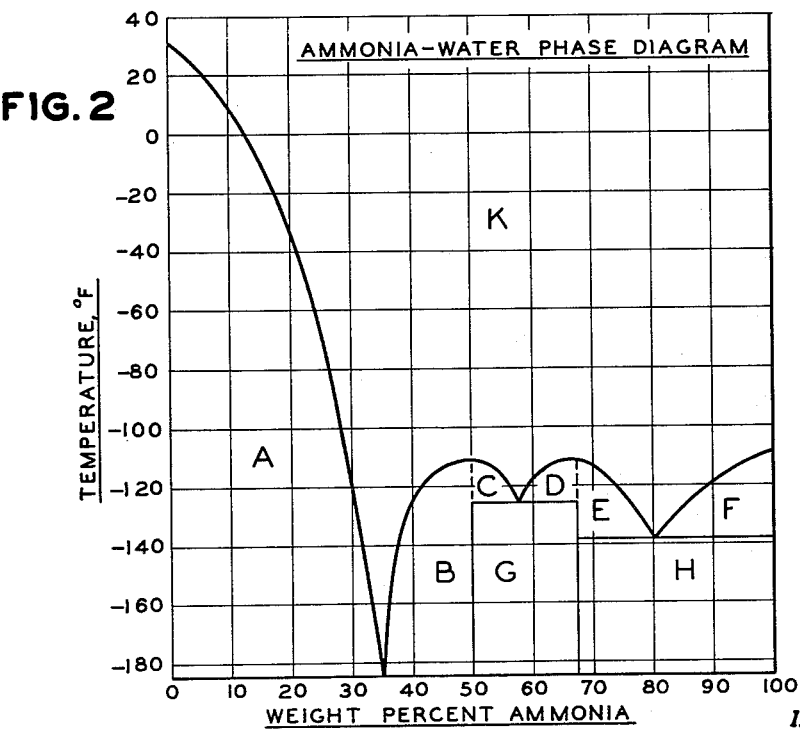

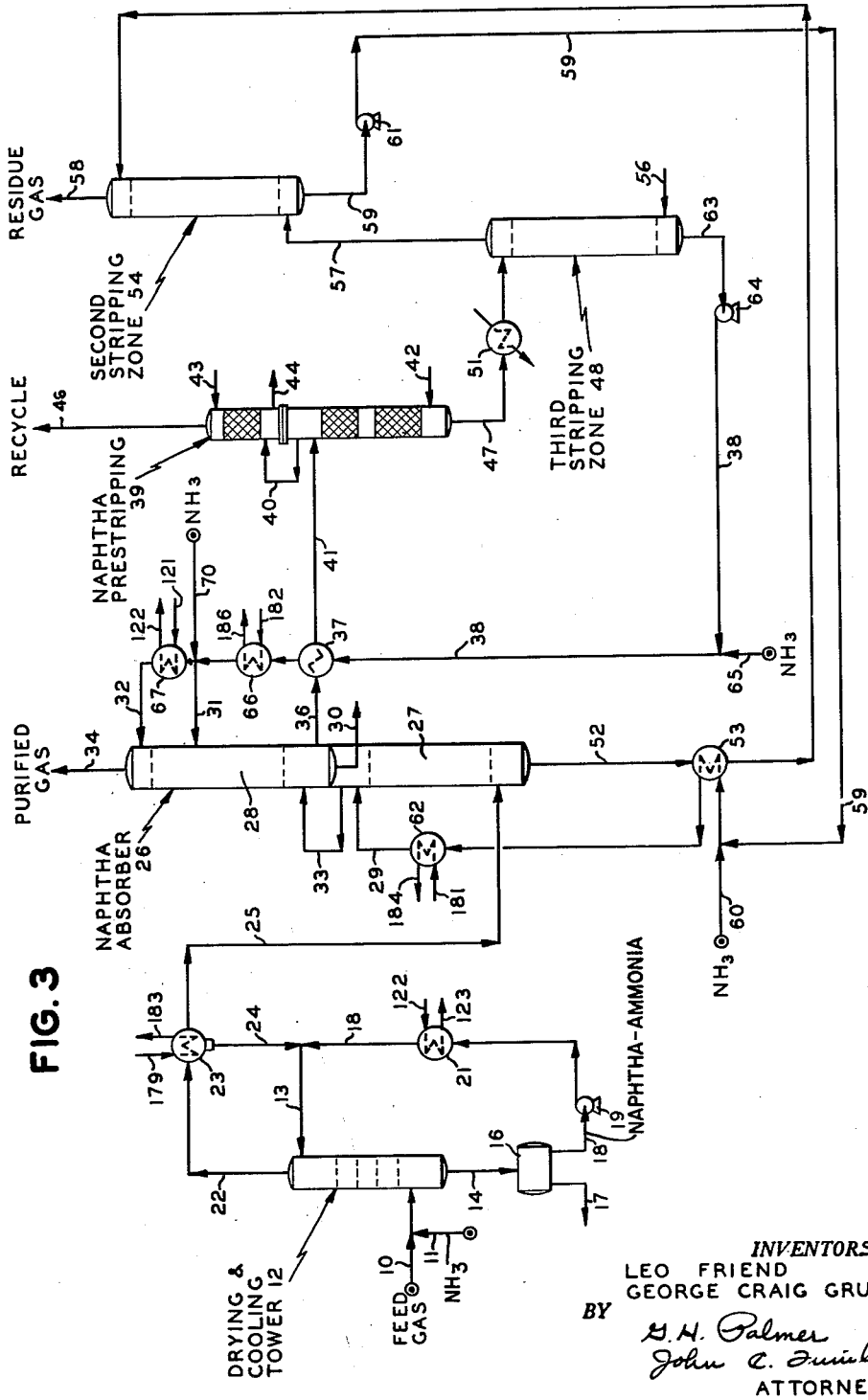

3,192,731
AMMONIA ADDITIVE IN LOW TEMPERATURE
HYDROCARBON-WATER SYSTEMS
Leo Friend, New Rochelle, N.Y., and George Craig
Grubb, Eatontown, N.J., assignors to Pullman Incorporated, a corporation of Delaware
Filed Mar. 17, 1961, Ser. No. 96,456
16 Claims. (Cl. 62—17)

The present invention relates to processes in which hydrocarbons and water are treated at low temperatures. In a particular aspect the invention relates to a method for preventing the freezing of water or the formation of hydrocarbon hydrates in processes in which hydrocarbons in a fluid condition are treated in the presence of liquid water at low temperatures.

In connection with the purification, separation or other treatment of fluid hydrocarbons, it is frequently advantageous to employ low temperatures, i.e., temperatures below ambient or below the freezing point of water. Unfortunately, however, the hydrocarbons to be treated frequently contain at least small amounts of water. Under the advantageous low temperature conditions this water freezes and/or forms solid hydrocarbon hydrates which build up in piping and equipment periodically forcing interruption of the process to permit removal of the solids formed.

One such process where the freezing of water presents a problem is a process in which acetylene is recovered from a gas produced by the pyrolysis of hydrocarbons. The pyrolysis effluent contains acetylene, heavier unsaturated hydrocarbons, hydrogen, carbon monoxide and carbon dioxide. The acetylene-containing pyrolysis effluent is first treated to remove carbon, tar and carbon dioxide. Hydrocarbons heavier than acetylene are then removed by absorption in heavy naphtha at temperatures preferably between about −30° F. and about 10° F. Acetylene is recovered from the resultant gas by absorption in a suitable selective solvent such as liquid ammonia. Prior to the naphtha absorption step, the gas must be substantially cooled from ambient or higher temperatures to a relatively low temperature between about −30° F. and about 10° F. in order to prevent excessive vaporization or circulation of the heavy naphtha in conjunction with the absorption step. Such cooling is advantageously achieved at least in part by directly contacting the gas with a cold heavy naphtha stream rather than by indirect heat exchange alone because heavy materials which can form from the unsaturated hydrocarbon components of the gas as a result of cooling are thereby effectively prevented from depositing on heat exchange surfaces and interfering with efficient heat transfer. Since the acetylene-containing gas also contains some water vapor formed during the reaction and picked up during the preliminary purification steps, cooling causes water to be condensed in the presence of liquid heavy naphtha at the low temperature conditions of operation. This water freezes unless prevented.

Another such process where the freezing of water presents a problem and where there is an additional problem of the formation of hydrocarbon hydrates is a process in which ethylene is recovered from its admixture with methane, ethane, propylene, propane, etc., by at least partial liquefaction and low temperature fractionation. Such a gas mixture can also be obtained by the pyrolysis of hydrocarbons. Usually, such a gas mixture is compressed to a pressure between about 100 p.s.i.g. and about 550 p.s.i.g. following which it is cooled in indirect heat exchange with successively lower boiling refrigerants until a temperature between about −150° F. and about 60° F. is reached, more usually between about −150° F. and about 32° F. Under these conditions, the mixture is partially liquefied and methane and lighter materials can be separated by fractionation from the ethylene and heavier materials. If the water vapor normally present in such a gas mixture is not first removed, hydrocarbon hydrates and ice are formed in the course of cooling and liquefaction.

Heretofore, in order to overcome the problems attending the presence of water at low temperatures, expensive drying operations were practiced or various expensive organic solvents such as methanol were injected into the system to function as antifreeze, or both were done. Apart from the costly nature of these measures, in some cases drying operations are inadequate to overcome completely the water problem and the use of methanol or the like is not practicable. For example, where it is necessary to remove water and methanol condensed or separated at low temperature from the process, relatively complicated procedures must be followed to recover the methanol from the methanol-water solution in order to prevent its loss from the system.

It is, therefore, an object of the present invention to provide an improved method for preventing freezing of water present with hydrocarbons undergoing treatment at low temperatures.

Another object of the invention is to provide a method for preventing the formation of hydrates of hydrocarbons undergoing treatment at low temperatures.

Another object of the invention is to provide a method for preventing the formation of ice or of hydrates of hydrocarbons undergoing treatment at low temperatures in liquid phase.

Various other objects and advantages of the invention will appear from the accompanying detailed discussion and description.

It has now been found that ammonia is an excellent antifreeze when used in controlled amounts in a fluid hydrocarbon-water system. Ammonia prevents the formation of ice regardless of whether the fluid hydrocarbon associated with the water in system is in liquid form, vaporous form or a mixture of both. Where both liquid hydrocarbons and liquid water are present in the system, ammonia can be added to prevent freezing of the aqueous phase without solubilizing that phase in the liquid hydrocarbon phase so that it is possible, employing ammonia as an antifreeze, to effect phase separation and to withdraw the aqueous phase from the system. In addition, it has been found that not only is the formation of ice prevented by the use of ammonia in controlled amounts but that the formation of hydrocarbon hydrates is prevented as well. In many applications where methanol or the like is impracticable for antifreeze purposes as described above, the use of ammonia is entirely practicable because of its relative lack of expense, ease of recovery, its relatively high vapor pressure, or for other reasons.

The amount of ammonia which must be supplied to a fluid hydrocarbon-water system depends upon whether the fluid hydrocarbons are in a liquid, vaporous or mixed condition and upon the low temperature imposed on the system. It has been found that in the case of a two-phase liquid hydrocarbon-water system, there is at any given temperature a definite equilibrium relationship between the ammonia concentration in the aqueous phase and that in the liquid hydrocarbon phase. This relationship is shown graphically in FIGURE 1 of the drawings in which the temperature of the system is a parameter. As shown by the graphical representation, ammonia is absorbed preferentially although not completely in the aqueous phase and its distribution between the two liquid phases is a function of temperature. FIG. 2 of the drawings is an ammonia-water phase diagram showing the relationship between the weight of ammonia in ammonia-water mixtures as a percentage and the corresponding freezing point in degrees Fahrenheit. The regions marked A, B, C, D, E and F on the phase diagram are those in which solid and liquid phases are in equilibrium, while regions G and H are those in which only a solid phase exists at equilibrium. All of the space above these regions, denoted as K, includes equilibrium conditions under which no solids are present.

Thus, according to the present invention, the formation of ice or of hydrocarbon hydrates in a fluid system containing hydrocarbons and liquid water maintained at temperatures below the freezing point of water is prevented by maintaining sufficient ammonia in the hydrocarbon-water system to produce an ammonia-water solution having a freezing point below the temperatures maintained on the system and, where liquid hydrocarbons are also present, to produce a hydrocarbon-ammonia solution having an ammonia concentration in equilibrium with the ammonia concentration in the ammonia-water solution.

As shown in FIG. 2, adequate ammonia concentrations in the aqueous phase (region K) prevent freezing at temperatures as low as about −184° F., at about which temperature and an ammonia concentration of about 34.5 weight percent, one eutectic mixture is formed. At temperatures between about −110° F. and about −184° F. the ammonia concentration must be carefully controlled within limits shown on FIG. 2 to prevent freezing. At temperatures above about −110° F. only the critical minimum ammonia concentration must be maintained in the aqueous phase to prevent freezing since greater concentrations do not fall within any two phase region. It is noted that an ammonia concentration adequate to prevent freezing or the formation of solids, as those terms are here used, prevents both ice and hydrocarbon-hydrate formation.

As indicated, the invention is applicable to any process in which fluid hydrocarbons and liquid water are maintained at temperatures below the freezing point of water. The required ammonia concentration to prevent freezing in the aqueous phase is deduced from FIG. 2 of the drawings and from the known lowest temperature to be imposed on the system. Where none of the hydrocarbon present is liquefied, supply of sufficient ammonia to give this ammonia concentration serves both to prevent icing and the formation of hydrates. Where liquid hydrocarbons are present, the required amount of ammonia to prevent solids formation is deduced from FIG. 2 as above and from FIG. 1 of the drawings so that not only is enough ammonia provided to prevent freezing of the aqueous phase but enough additional ammonia is provided to produce an equilibrium concentration of ammonia in the liquid hydrocarbon phase. The ammonia requirement is, therefore, influenced by the amount of the liquid hydrocarbon and aqueous phases and the lowest temperature to which they are subjected but is unaffected by the particular character of the hydrocarbon liquid phase, i.e, the relationships given in FIG. 1 are essentially independent of the molecular weight, structure or other properties of the hydrocarbon liquid phase. The method of the invention can, therefore, be applied both to systems in which normally gaseous hydrocarbons are treated in liquid or vaporous form under low temperatures and to systems in which normally liquid hydrocarbons are treated.

The ammonia requirement of the process determined as discussed above is supplied at a relatively warm point in the process upstream from the point where freezing or hydrate formation are to be prevented. Thus, for example, in partially liquefying normally gaseous hydrocarbons by compression and cooling to temperatures below the freezing point of water, ammonia is preferably injected upstream from the cooling steps as vapor so that the ammonia is absorbed into the water and hydrocarbon phases as they condense during the cooling steps. In this way, a mixture of normally gaseous hydrocarbons containing water can be cooled by indirect heat exchange with successively lower boiling refrigerants and between some or all of the successive heat exchanges, the condensed liquid can be separated. Where this liquid is entirely aqueous, it can be withdrawn directly from the system. Where the liquid includes condensed hydrocarbons as well, the liquid can be permitted to separate into two phases and the aqueous phase can be withdrawn. Sufficient ammonia remains in the vaporous phase to provide antifreeze throughout the several cooling steps and subsequent low-temperature fractionation. Hence, drying operations which are normally practiced can be eliminated or reduced. Where a vaporous stream containing water vapor such as the acetylene-containing gas referred to hereinabove is contacted with a cold liquid hydrocarbon stream at a temperature below the freezing point of water, the ammonia requirement can be supplied by injecting ammonia into the gas upstream from the contacting step or into the liquid hydrocarbon stream upstream from the contacting step or both methods can be employed.

For a specific example of one preferred embodiment of the invention, reference is had to FIG. 3 of the accompanying drawings which shows diagrammatically apparatus suitable for the removal of acetylene homologues and other hydrocarbons heavier than acetylene from an acetylene-containing gas. Referring to FIG. 3 about 4533.4 mols per hour of a gas stream containing acetylene obtained by the pyrolysis of natural gas and treated for the removal of carbon, tar and carbon dioxide are introduced through line 10 at a temperature of 95° F. and a pressure of 57 p.s.i.g. This gas has the composition given below in Table I.

TABLE I

*Feed gas composition, mols per hour*

| | |
|---|---:|
| $H_2$ | 2589.9 |
| $N_2$ | 41.0 |
| CO | 1171.2 |
| $CO_2$ | 0.4 |
| $CH_4$ | 222.4 |
| $C_2H_2$ | 381.4 |
| $C_2H_4$ | 21.6 |
| $C_3H_4$ [1] | 3.5 |
| $C_3H_4$ [2] | 1.9 |
| $C_3H_6$ | 0.5 |
| $C_4H_2$ | 9.4 |
| $C_4H_4$ | 4.3 |
| $C_4H_6$ | 0.5 |
| $C_6H_6$ | 3.6 |
| $H_2O$ | 60.0 |
| $NH_3$ | 21.8 |
| | 4533.4 |

[1] Methyl acetylene.
[2] Propadiene.

The gas stream in line 10 flows to the lower portion of a drying and cooling tower 12. The gas is cooled by countercurrent contact with a cold heavy naphtha stream introduced through line 13 at a rate of about 110,161 pounds per hour (average L/V=0.17). A bottoms liquid fraction containing naphtha and ammonia-water is withdrawn from tower 12 at 85° F. through line 14 and permitted to separate into hydrocarbon and ammonia-water phases in separation drum 16 from which the ammonia-water solution having an ammonia concentration of about 2 weight percent is continuously withdrawn at a rate of about 129 gallons per hour through line 17. The hydrocarbon phase is recirculated to tower 12 in lines 18 and 13 by pump 19 after cooling to 28° F. by indirect heat exchange in heat exchanger 21. A cold tail gas at −30° F. is introduced into exchanger 21 through line 122 and withdrawn through line 123 at 70° F. to provide the cooling duty of the exchanger. Important advantages are gained by use of a limited amount of naphtha as coolant. While there is no appreciable absorption by the naphtha of components of the gas, it carries down any heavy carbonaceous materials which might otherwise foul the surfaces of an indirect heat exchanger. Any naphtha which is vaporized need not be removed from the cooled gas as it is absorbed by the colder naphtha in the subsequent steps. The pyrolysis gas still containing water and ammonia vapor and saturated with naphtha is withdrawn from tower 12 through line 22 at a temperature of 31° F. and a pressure of 55 p.s.i.g. The naphtha-saturated gas stream flowing in line 22 passes through heat exchanger 23 where its temperature is lowered to −10° F. As a result of this cooling, about 161 pounds per hour of naphtha and ammonia-water are condensed in exchanger 23 and returned to tower 12 through line 24. The cooling duty of exchanger 23 is provided by vaporizing liquid ammonia at −23° F. and 2 p.s.i.g. The ammonia refrigerant is introduced to exchanger 23 through line 179 and is withdrawn through line 183.

Ice formation in tower 12 and exchanger 23 is prevented by the presence of ammonia which dissolves in the water condensed as a result of cooling. The ammonia content of the feed gas in line 10 is ordinarily adequate not only to prevent freezing in tower 12 and exchanger 23 but to supply part of the ammonia antifreeze requirement in the subsequent process steps. However, the ammonia content of the feed gas in line 10 is subject to some fluctuation creating from time to time conditions under which ice can form. Provision is, therefore, made to introduce an ammonia-rich stream through line 11 into the feed gas in line 10 so that the ammonia content of the gas entering tower 12 is always maintained at adequate levels and interruption of the process due to icing is precluded.

The chilled acetylene-containing gas from exchanger 23 passes in line 25 to a naphtha absorption column 26 which is operated at a bottom temperature of −2° F. and a pressure of 53 p.s.i.g. and a top temperature of −36° F. and a pressure of 48 p.s.i.g. Absorption column 26 is provided with a lower absorption zone 27 and an upper absorption zone 28 which are interconnected only for the upward passage of gas by line 33. Approximately 30,217 pounds per hour of heavy naphtha are introduced into the top of the lower absorption zone 27 (average L/V=0.047) through line 29 as discussed more fully below. Approximately 239,432 pounds per hour of heavy naphtha are introduced into the top of upper absorption zone 28 (average L/V=0.38) through line 31 and 32, as discussed more fully below. The cooled and dried acetylene-containing gas introduced into the bottom of naphtha absorption column 26 through line 25 passes countercurrently with the relatively small naphtha stream in the lower absorption zone 27, thence through line 33 at a temperature of about −10° F. and a pressure of about 52 p.s.i.g. to the upper absorption zone 28 and then countercurrently with the relatively large naphtha stream in the upper absorption zone 28, from which approximately 4423.2 mols per hour of acetylene containing gas substantially free of acetylene homologues are withdrawn as an overhead fraction in line 34. The compoistion of this purified gas is given below in Table II.

TABLE II

*Purified gas composition, mols per hour*

| | |
|---|---|
| $H_2$ | 2588.2 |
| $N_2$ | 41.0 |
| $CO$ | 1171.3 |
| $CO_2$ | 0.4 |
| $CH_4$ | 221.6 |
| $C_2H_2$ | 364.6 |
| $C_2H_4$ | 20.5 |
| $C_3H_4$ [1] | 1.1 |
| $C_3H_4$ [2] | 0.3 |
| $C_3H_6$ | 0.2 |
| $C_4H_2$ | 0.1 |
| $C_4H_4$ | nil |
| $C_4H_6$ | nil |
| $C_6H_6$ | nil |
| $H_2O$ | 0.2 |
| $NH_3$ | 13.7 |
| | 4423.2 |

[1] Methyl acetylene.
[2] Propadiene.

Approximately 240,730 pounds per hour of rich naphtha absorbent containing absorbed acetylene homologues and some acetylene and ethylene are withdrawn from the bottom of upper absorption zone 28 through line 36 at a temperature of −7° F. This bottoms stream is heated to 70° F. in exchanger 37 by indirect heat exchange with recirculating lean naphtha flowing in line 38. The heated rich naphtha stream is passed from exchanger 37 to the lower section of a naphtha prestripping column 39 through line 41. The upper and lower sections of prestripper 39 are interconnected only for the upward passage of gas through line 40. The lower section of prestripper 39 operates at a bottom temperature of 69° F. and a pressure of 8 p.s.i.g. and a top temperature of 70° F. and a pressure of 5 p.s.i.g. In prestripper 39, the rich naphtha absorbent is stripped in the lower section by countercurrent contact with about 38.0 mols per hour of product gas (average V/L=0.021) at 60° F. which is introduced into the bottom of prestripper 39 through line 42. The composition of the product gas used to provide stripping gases is given below in Table III.

TABLE III

*Composition of stripping gas, mol percent*

| | |
|---|---|
| $H_2$ | 63.6 |
| $N_2$ | 1.0 |
| $CO$ | 28.7 |
| $CO_2$ | nil |
| $CH_4$ | 5.4 |
| $C_2H_2$ | 0.1 |
| $C_2H_4$ | 0.5 |
| $C_3H_4$ [1] | 0.1 |
| $C_3H_4$ [2] | 0.1 |
| $C_3H_6$ | nil |
| $C_4H_2$ | nil |
| $C_4H_6$ | nil |
| $C_6H_6$ | nil |
| $H_2O$ | 0.5 |
| $NH_3$ | 0.1 |
| | 100.0 |

[1] Methyl acetylene.
[2] Propadiene.

Water at 100° F. is introduced into the upper section of the prestripper through line 43 and withdrawn therefrom through line 44 at 103° F. so as to reabsorb small amounts of ammonia stripped together with the acetylene and ethylene from the rich naphtha stream in the lower section of the prestripper by product gases. Thus, the overhead recovered from prestripper 39 at a temperature of 100° in line 46 contains substantially only acetylene, ethylene and product gases which are recycled to the feed gas at a rate of about 61.4 mols per hour. The composition of this recycle stream is given below in Table IV.

TABLE IV

Recycle prestripper overhead gas, mols per hour

| | |
|---|---|
| $H_2$ | 25.0 |
| $N_2$ | 0.5 |
| CO | 13.9 |
| $CH_4$ | 3.7 |
| $C_2H_2$ | 13.4 |
| $C_2H_4$ | 1.0 |
| $C_3H_4$ [1] | 0.3 |
| $C_3H_4$ [2] | 0.1 |
| $C_4H_2$ | 0.3 |
| $C_4H_4$ | 0.2 |
| $H_2O$ | 2.9 |
| $NH_3$ | 0.1 |
| | 61.4 |

[1] Methyl acetylene.
[2] Propadiene.

Approximately 30,698 pounds per hour of rich naphtha absorbent are withdrawn from the bottom of the lower absorption zone 27 of naphtha absorption column 26 in line 52 and are delivered to the top of a second stripping zone 54 after being heated to 52° F. by indirect heat exchange with recirculating lean naphtha in heat exchanger 53. The second stripping zone 54 is maintained at a bottom temperature of 76° F. and pressure of 23 p.s.i.g. and a top temperature of 70° F. and a pressure of 22 p.s.i.g.

Approximately 240,141 pounds per hour of naphtha absorbent containing absorbed acetylene homologues but substantially free of acetylene and ethylene are withdrawn from the bottom of naphtha prestripping column 39 through line 47 and are delivered to the top of a third stripping zone 48, after being heated to 100° F. by indirect heat exchange with hot water in heat exchanger 51. Approximately 1678.6 mols per hour of product gas of the same composition as that given in Table III at a temperature of 60° F. are introduced into the lower portion of third stripping zone 48 through line 56 to provide requisite stripping gases (average V/L=1.0). Third stripping zone 48 is maintained at a bottom temperature of about 94° F. and a pressure of 25 p.s.i.g. and a top temperature of about 100° F. and a pressure of 23 p.s.i.g. The overhead fraction from third stripping zone 48 containing the product gases and the stripped acetylene homologues is withdrawn in line 57 and has the composition given in Table V below.

TABLE V

Third stripping zone overhead gas, mols per hour

| | |
|---|---|
| $H_2$ | 1069.0 |
| $N_2$ | 16.7 |
| CO | 479.6 |
| $CH_4$ | 90.1 |
| $C_2H_2$ | 3.9 |
| $C_2H_4$ | 8.5 |
| $C_3H_4$ [1] | 2.6 |
| $C_3H_4$ [2] | 1.4 |
| $C_3H_6$ | 0.3 |
| $C_4H_2$ | 6.8 |
| $C_4H_4$ | 3.3 |
| $C_4H_6$ | 0.3 |
| $C_6H_6$ | 0.4 |
| $C_8$ | 1.0 |
| $C_9$ | 2.0 |
| $C_{10}$ | 1.6 |
| $C_{11}$ | 0.2 |
| $H_2O$ | 8.3 |
| $NH_3$ | 3.3 |
| | 1699.3 |

[1] Methyl acetylene.
[2] Propadiene.

The overhead fraction from third stripping zone 48 is introduced into the lower portion of second stripping zone 54 to provide requisite stripping gases (average V/L=8.1). In second stripping zone 54 substantially all of the hydrocarbon impurities picked up by the absorbent in lower absorption zone 27 are desorbed and appear along with the stripping gases introduced in line 57 in the overhead fraction in line 58 from second stripping zone 54. The residue gas in line 58 is withdrawn at a rate of about 1705.7 mols per hour and has the composition given in Table VI below.

TABLE VI

Second stripping zone overhead gas, mols per hour

| | |
|---|---|
| $H_2$ | 1068.8 |
| $N_2$ | 16.7 |
| CO | 479.5 |
| $CH_4$ | 90.0 |
| $C_2H_2$ | 5.6 |
| $C_2H_4$ | 8.5 |
| $C_3H_4$ [1] | 2.8 |
| $C_3H_4$ [2] | 1.5 |
| $C_3H_6$ | 0.3 |
| $C_4H_2$ | 9.0 |
| $C_4H_4$ | 4.1 |
| $C_4H_6$ | 0.5 |
| $C_6H_6$ | 3.6 |
| $C_8$ | 0.4 |
| $C_9$ | 1.3 |
| $C_{10}$ | 0.5 |
| $H_2O$ | 8.3 |
| $NH_3$ | 4.3 |
| | 1705.7 |

[1] Methyl acetylene.
[2] Propadiene.

It should be understood that fresh product gases can be used in whole or in part to provide stripping gases in second stripping zone 54 just as are used in third stripping zone 48. Conditions in this example are such that the entire overhead fraction of the third stripping zone 48 is just sufficient to provide the stripping gas requirement of the second stripping zone 54. Because of the relatively small liquid rate in the second stripping zone and despite the fact that it is somewhat cooler than the third stripping zone, there is no appreciable reabsorption of the hydrocarbon impurities desorbed in the third stripping zone but there is some beneficial reabsorption of vaporized absorbent.

A regenerated naphtha stream is recovered as the bottoms fraction of the second stripping zone in line 59 and is recirculated at a rate of about 30,217 pounds per hour to the upper portion of lower absorption zone 27 in naphtha absorption column 26 through lines 59 and 29 by pump 61 after being cooled in exchanger 53 to 22° F. by rich naphtha flowing in line 52 and after being further cooled in exchanger 62 to −10° F. The refrigeration requirements of exchanger 62 are supplied by evaporating liquid ammonia at 2 p.s.i.g. and −23° F. The liquid ammonia is introduced into exchanger 62 through line 181 and the vaporized ammonia is withdrawn through line 184.

Regenerated naphtha is also recovered as the bottoms fraction of the third stripping zone 48 in line 63. This lean naphtha stream together with a small amount of make-up naphtha is delivered by pump 64 at a rate of about 239,432 pounds per hour through line 38 to heat exchanger 37 in which it is chilled to 20° F. by indirect heat exchange with cold rich naphtha absorbent flowing in lines 36 and 41. From exchanger 37 the lean naphtha stream passes to exchanger 66 in which it is cooled to −10° F. by indirect heat exchange with liquid ammonia vaporizing at 2 p.s.i.g., and −23° F. Liquid ammonia is introduced into exchanger 66 through line 182 and the vaporous ammonia is withdrawn through line 186. Approximately 177,347 pounds per hour of the −10° F.

lean naphtha is passed in line 31 from exchanger 66 to a point near the top of the upper absorption zone 28 of naphtha absorption column 26. The balance of the −10° F. lean naphtha is further cooled in heat exchanger 67 to −40° F. by indirect heat exchange with a cold tail gas which is introduced into exchanger 67 through line 121 at −55° F. and is withdrawn from exchanger 67 through line 122 at −32° F. The −40° F. lean naphtha then passes in line 32 at a rate of about 62,085 pounds per hour to the top of upper absorption zone 28 of naphtha absorption column 26. It should be understood that all of the lean naphtha recirculating to the upper absorption zone 28 from the third stripping zone 48 through lines 63 and 38 can be introduced at a single point and at the higher temperature to absorption zone 28. The purpose of further chilling a portion of the recirculating lean naphtha stream is to reduce the temperature of the purified gas withdrawn through line 34 from the upper absorption zone 28 consistent with the subsequent treatment of the purified gas in a low temperature process for the selective absorption of acetylene. Since the upflowing gas in absorption zone 28 contains some water vapor and vaporized absorbent, cooling to −36° F. in the top portion thereof causes substantially all of these materials to be condensed. An ammonia-water phase is permitted to separate in the lower portion of absorption zone 28 and is withdrawn therefrom through line 30. Cooling in the absorption zone rather than in an external heat exchanger avoids pumping small amounts of cold condensed absorbent and ammonia-water back into the system.

The recirculating naphtha stream in line 38 contains small amounts of water picked up in the second absorption zone by virtue of the cooling and condensing there done. To prevent the freezing of this water which amounts to about 7 pounds per hour and of that in the second absorption zone, about 20 pounds per hour of ammonia are injected through line 65 into the relatively large recirculating lean naphtha stream in line 38 upstream from exchanger 37 and about 4 pounds per hour of ammonia are injected through line 70 into the portion of the relatively large recirculating lean naphtha stream cooled to −40° F. in exchanger 67 and thereafter flowing in line 32, upstream from exchanger 67. Residual ammonia in the gas entering absorption zone 28 in line 33 provides part of the ammonia antifreeze requirement in this absorption zone. The relatively small recirculating lean naphtha stream in line 59 is normally water-free since the gas is not cooled in absorption zone 27 so that ammonia antifreeze need not be continuously injected. However, under some circumstances, such as start-up, some water is present and provision is made to inject ammonia into line 59 through line 69 upstream from exchanger 53.

In each of the foregoing circulating systems a virgin naphtha is used having a boiling range of 311° F. to 435° F. (ASTM distillation), a specific gravity of 48.0° API and a Watson K factor of 11.95.

The ammonia-water solutions recovered in lines 17, 30 and 44 are combined and the ammonia is recovered for reuse by distillation means not shown.

Referring again to FIG. 1 of the drawings, the data were obtained for this graphical correlation in accordance with the following procedure. Aqueous ammonia and liquid normal heptane were placed in a flask which was shaken periodically while the contents were maintained at a constant temperature. Samples of the resulting aqueous and hydrocarbon phases were withdrawn and analyzed for ammonia. The tests were repeated at different ammonia concentrations for each temperature to provide sufficient data to construct the isotherms shown.

As an example of experiments which established the utility of ammonia in prevention of hydrocarbon hydrates, a mixture of ethylene, aqueous ammonia and methane was maintained at −105° F. and 300 p.s.i.g. in a Jerguson gauge for 24 hours with periodic shaking. Two liquid phases were present throughout both of which were quite fluid. No solids could be observed. The aqueous phase contained 45 weight percent ammonia while the liquid hydrocarbon phase comprised an equimolar mixture of methane and ethylene. A similar procedure comprising contacting ammonia-free water with an equimolar mixture of ethylene and methane resulted in the formation of a solid hydrate upon cooling to about +38° F.

Various modifications and alterations of the process of this invention will be apparent to those skilled in the art and may be used without departing from the scope of the invention.

We claim:

1. A method for preventing the formation of solids in a system having separate liquid hydrocarbon and liquid water phases maintained at temperatures below the freezing point of water which comprises maintaining small controlled amounts of ammonia in said system sufficient to produce an ammonia-water solution having a freezing point below said temperatures and to produce a hydrocarbon-ammonia solution having an ammonia concentration in equilibrium with the ammonia concentration in the ammonia-water solution but insufficient to solubilize said liquid water phase in said liquid hydrocarbon phase, whereby water can be separated by phase separation.

2. In a process comprising cooling a vaporous mixture containing hydrocarbons and water to a temperature below the freezing point of water under conditions where hydrocarbons and water condense, the improved method for preventing the formation of solids which comprises supplying small controlled amounts of ammonia to said vaporous mixture prior to said cooling step sufficient to produce an ammonia concentration in the water condensed in the cooling step at least equal to that of an ammonia-water solution having a freezing point below the lowest temperature reached in the cooling step and to produce an ammonia concentration in the hydrocarbons condensed in the cooling step in equilibrium with the ammonia concentration in said condensed water but insufficient to solubilize said condensed water in said condensed hydrocarbons, whereby water can be separated by phase separation.

3. In a process comprising cooling a vaporous mixture containing methane, ethylene, ethane, propylene, propane and water to a temperature below the freezing point of water under conditions where hydrocarbons and water condense, the improved method for preventing the formation of solids which comprises supplying small controlled amounts of ammonia to said vaporous mixture prior to said cooling step sufficient to produce an ammonia concentration in the water condensed in the cooling step at least equal to that of an ammonia-water solution having a freezing point below the lowest temperature reached in the cooling step and to produce an ammonia concentration in the hydrocarbons condensed in the cooling step in equilibrium with the ammonia concentration in said condensed water but insufficient to solubilize said condensed water in said condensed hydrocarbons, whereby water can be separated by phase separation.

4. In a process comprising cooling a vaporous mixture containing methane, ethylene, ethane, propylene, propane and water maintained at a pressure between about 100 p.s.i.g. and about 550 p.s.i.g. to a tempearture between about −150° F. and about 60° F. whereby hydrocarbons and water condense, the method for preventing the formation of solids which comprises supplying small controlled amounts of ammonia to said vaporous mixture prior to said cooling step sufficient to produce an ammonia concentration in the water condensed in the cooling step at least equal to that of an ammonia-water solution having a freezing point below the lowest temperature reached in the cooling step and to produce an ammonia concentration in the hydrocarbons condensed in the cooling step in equilibrium with the ammonia concentration in said condensed water but insufficient to solubilize said condensed water in said condensed hydrocarbons, whereby water can be separated by phase separation.

5. A process for cooling a vaporous mixture containing acetylene, heavier unsaturated hydrocarbons, hydrogen, carbon oxides and water which comprises contacting said mixture in a contacting zone with relatively cold liquid hydrocarbons at an initial temperature below the freezing point of water, whereby said mixture is cooled and at least a portion of said water is condensed and maintaining small controlled amounts of ammonia in said contacting zone sufficient to provide an ammonia concentration in the water condensed in the contacting zone at least equal to that of an ammonia-water solution having a freezing point below said initial temperature of said cold liquid hydrocarbons and to provide an ammonia concentration in said liquid hydrocarbons in equilibrium with the ammonia concentration in said condensed water but insufficient to solubilize said condensed water in said liquid hydrocarbons, whereby water can be separated by phase separation.

6. A process according to claim 5 in which heavy naphtha constitutes said cold liquid hydrocarbons.

7. A process for removing unsaturated hydrocarbons heavier than acetylene from a vaporous mixture containing the same, acetylene, hydrogen, carbon oxides and water by absorption into cold liquid hydrocarbons at a temperature below the freezing point of water which comprises contacting said mixture at an initial temperature above the freezing point of water in a contacting zone with a first stream of liquid hydrocarbons at an initial temperature below the freezing point of water whereby said mixture is cooled and at least a portion of said water is condensed, contacting said cooled vaporous mixture from said contacting zone with a second stream of liquid hydrocarbons in an absorption zone maintained under suitable conditions to absorb said unsaturated hydrocarbons heavier than acetylene from said cooled mixture including a temperature below the freezing point of water, and maintaining sufficient ammonia in said contacting zone to provide an ammonia concentration in the water condensed in the contacting zone at least equal to that of an ammonia-water solution having a freezing point below the initial temperature of said first stream of liquid hydrocarbons and to provide an ammonia concentration in said liquid hydrocarbons in said contacting zone in equilibrium with the ammonia concentration in said condensed water in said contacting zone.

8. A process according to claim 7 in which each of said streams of liquid hydrocarbons is heavy naphtha and in which said absorption zone is maintained at a temperature between about −30° F. and about 10° F.

9. A process for removing unsaturated hydrocarbons heavier than acetylene from a vaporous mixture containing the same, acetylene, hydrogen, carbon oxides and water by absorption into cold liquid hydrocarbons at a temperature below the freezing point of water which comprises contacting said mixture at a temperature below the freezing point of water with a first stream of liquid hydrocarbons at a temperature substantially the same as that of said mixture in an absorption zone maintained under suitable conditions to absorb said unsaturated hydrocarbons heavier than acetylene from said mixture, thereafter contacting said mixture in said absorption zone with a second stream of liquid hydrocarbons at a temperature lower than that of said first stream of liquid hydrocarbons whereby said mixture is cooled and at least a portion of said water is condensed, permitting condensed water to separate in said absorption zone, withdrawing condensed water from said absorption zone, and maintaining sufficient ammonia in said absorption zone to provide an ammonia concentration in the water condensed in said zone at least equal to that of an ammonia-water solution having a freezing point below the temperature of said second stream of liquid hydrocarbons and to provide an ammonia concentration in said liquid hydrocarbons in said absorption zone in equilibrium with the ammonia concentration in said condensed water.

10. A process as defined in claim 9 in which each of said streams of liquid hydrocarbons is heavy naphtha and in which the temperature of said mixture and of said first stream of liquid hydrocarbons is between about −30° F. and about 10° F.

11. A process for removing unsaturated hydrocarbons heavier than acetylene from a vaporous mixture containing the same, acetylene, hydrogen, carbon oxides and water by absorption into cold liquid hydrocarbons at a temperature below the freezing point of water which comprises contacting said mixture at an initial temperature above the freezing point of water in a contacting zone with a first stream of liquid hydrocarbons at an initial temperature below the freezing point of water whereby said mixture is cooled and a portion of said water is condensed, contacting said cold vaporous mixture from said contacting zone with a second stream of liquid hydrocarbons at a temperature below the freezing point of water in an absorption zone maintained under suitable conditions to absorb said unsaturated hydrocarbons heavier than acetylene from said mixture, thereafter contacting said mixture in said absorption zone with a third stream of liquid hydrocarbons at a temperature lower than that of said second stream of liquid hydrocarbons whereby said mixture is further cooled and at least another portion of said water is condensed, permitting condensed water to separate in said absorption zone, withdrawing condensed water from said absorption zone, and maintaining sufficient ammonia in each of said zones to provide an ammonia concentration in the water condensed in each at least equal to that of an ammonia-water solution having a freezing point below the temperature of the coldest stream of liquid hydrocarbons introduced into that zone and to provide an ammonia concentration in the liquid hydrocarbons in that zone in equilibrium with the ammonia concentration in the condensed water in that zone.

12. A process according to claim 11 in which each of said streams of liquid hydrocarbons is heavy naphtha and in which said conditions in said absorption zone include temperatures between about −30° F. and about 10° F.

13. In a process for cooling a stream of a relatively warm vaporous mixture containing hydrocarbons and water under conditions where water condenses comprising contacting said vaporous mixture in a contacting zone with a relatively cold stream of liquid hydrocarbons at an initial temperature below the freezing point of water, the improved method for preventing the formation of ice which comprises maintaining small controlled amounts of ammonia in the streams introduced into said contacting zone sufficient to provide an ammonia concentration in the water condensed in the contacting zone at least equal to that of an ammonia-water solution having a freezing point below the initial temperature of said cold stream of liquid hydrocarbons and to provide an ammonia concentration in said liquid hydrocarbons in equilibrium with the ammonia concentration in said condensed water but insufficient to solubilize said condensed water in said liquid hydrocarbons, whereby water can be separated by phase separation.

14. In a process for cooling a stream of relatively warm vaporous mixture containing acetylene and water under conditions where water condenses comprising contacting said vaporous mixture in a contacting zone with a relatively cold stream of liquid heavy naphtha at an initial temperature below the freezing point of water, the improved method for preventing the formation of ice which comprises maintaining small controlled amounts of ammonia in the streams introduced into said contacting zone sufficient to provide an ammonia concentration in the water condensed in the contacting zone at least equal to that of an ammonia-water solution having a freezing point below the initial temperature of said cold heavy naphtha and to provide an ammonia concentration in said heavy naphtha in equilibrium with the ammonia concentration in said condensed water but insufficient to solubilize said condensed water in said heavy naphtha, permitting condensed water to separate as a separate phase in said contacting zone and withdrawing said condensed water containing ammonia from said contacting zone.

15. In a process for cooling a relatively warm vaporous mixture containing acetylene and water under conditions where water condenses comprising contacting said vaporous mixture with a relatively cold stream of liquid heavy naphtha at an initial temperature below the freezing point of water, the improved method for preventing the formation of ice which comprises supplying small controlled amounts of ammonia to said vaporous mixture prior to said contacting step sufficient to produce an ammonia concentration in the water condensed in the contacting step at least equal to that of an ammonia-water solution having a freezing point below the initial temperature of said cold heavy naphtha and to produce an ammonia concentration in said heavy naphtha in equilibrium with the ammonia concentration in said condensed water but insufficient to solubilize said condensed water in said heavy naphtha, whereby water can be separated by phase separation.

16. In a process for cooling a relatively warm vaporous mixture containing acetylene and water under conditions where water condenses comprising contacting said vaporous mixture with a relatively cold stream of liquid heavy naphtha at an initial temperature below the freezing point of water, the improved method for preventing the formation of ice which comprises supplying small controlled amounts of ammonia to said stream of cold heavy naphtha prior to said contacting step sufficient to produce an ammonia concentration in the water condensed in the contacting step at least equal to that of an ammonia-water solution having a freezing point below the initial temperature of said cold heavy naphtha and to produce an ammonia concentration in said heavy naphtha in equilibrium with the ammonia concentration in said condensed water but insufficient to solubilize said condensed water in said heavy naphtha, whereby water can be separated by phase separation.

References Cited by the Examiner

UNITED STATES PATENTS

| | | | |
|---|---|---|---|
| 1,988,032 | 1/35 | Baumann. | |
| 2,601,599 | 6/52 | Deming. | |
| 2,620,895 | 12/52 | Turner. | |
| 2,690,814 | 10/54 | Reid | 62—20 X |
| 2,856,258 | 10/58 | Braconier et al. | |
| 2,891,633 | 6/59 | Morro et al. | |
| 2,937,714 | 5/60 | Braconnier | 55—64 X |
| 2,995,903 | 8/61 | Schmalenbach | 62—20 |
| 3,023,842 | 3/62 | Grover | 55—64 |
| 3,023,843 | 3/62 | Grubb | 55—64 X |
| 3,026,969 | 3/62 | Braconnier | 55—65 |

NORMAN YUDKOFF, *Primary Examiner.*

ROBERT A. O'LEARY, *Examiner.*